US012609357B2

(12) United States Patent
Sung et al.

(10) Patent No.: US 12,609,357 B2
(45) Date of Patent: *Apr. 21, 2026

(54) METHOD FOR MANUFACTURING LITHIUM SECONDARY BATTERY COMPRISING LITHIUM-RICH MANGANESE BASED OXIDE

(71) Applicant: LG Energy Solution, Ltd., Seoul (KR)

(72) Inventors: Kiwon Sung, Daejeon (KR); Yojin Kim, Daejeon (KR); Jinseo Park, Daejeon (KR); Hyeyeon Kang, Daejeon (KR); Bohyun Kang, Daejeon (KR); Daeun Jang, Daejeon (KR); Youngseong Jo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/392,978

(22) Filed: Dec. 21, 2023

(65) Prior Publication Data

US 2024/0413404 A1 Dec. 12, 2024

(30) Foreign Application Priority Data

Dec. 23, 2022 (KR) ......................... 10-2022-0183684

(51) Int. Cl.
| | |
|---|---|
| *H01M 10/058* | (2010.01) |
| *H01M 4/04* | (2006.01) |
| *H01M 10/04* | (2006.01) |
| *H01M 10/0525* | (2010.01) |
| *H01M 10/44* | (2006.01) |

(52) U.S. Cl.
CPC ......... *H01M 10/058* (2013.01); *H01M 4/044* (2013.01); *H01M 4/0445* (2013.01); *H01M 4/0447* (2013.01); *H01M 10/0481* (2013.01); *H01M 10/0525* (2013.01); *H01M 10/446* (2013.01)

(58) Field of Classification Search
CPC .. H01M 4/044; H01M 4/0445; H01M 4/0447; H01M 10/446
See application file for complete search history.

(56) References Cited

U.S. PATENT DOCUMENTS

| | | | | |
|---|---|---|---|---|
| 5,871,865 | A * | 2/1999 | Barker .............. | H01M 10/0565 29/623.2 |
| 12,456,749 | B2 | 10/2025 | Hwang | |
| 2003/0108793 | A1* | 6/2003 | Dahn .................... | H01M 4/505 429/231.1 |
| 2007/0037043 | A1 | 2/2007 | Chang et al. | |
| 2018/0076486 | A1 | 3/2018 | Noguchi et al. | |

| | | | | |
|---|---|---|---|---|
| 2019/0113577 | A1 | 4/2019 | Severson et al. | |
| 2019/0123389 | A1 | 4/2019 | Nakagaki et al. | |
| 2019/0341647 | A1 | 11/2019 | Woo et al. | |
| 2020/0020942 | A1* | 1/2020 | Han ................... | H01M 4/1391 |
| 2020/0044233 | A1 | 2/2020 | Choi et al. | |
| 2021/0135304 | A1* | 5/2021 | Lee ..................... | H01M 4/0447 |
| 2021/0226196 | A1* | 7/2021 | Park ................... | H01M 4/1395 |
| 2021/0257665 | A1* | 8/2021 | Muramatsu ....... | H01M 10/0567 |
| 2022/0006313 | A1* | 1/2022 | Lim ................... | H01M 10/486 |
| 2022/0077491 | A1 | 3/2022 | Kim et al. | |
| 2022/0093982 | A1* | 3/2022 | Mitsui .................. | H01M 4/483 |
| 2022/0223873 | A1 | 7/2022 | Hirano | |
| 2023/0049301 | A1 | 2/2023 | Hwang | |
| 2023/0064213 | A1 | 3/2023 | Jung et al. | |
| 2023/0155199 | A1 | 5/2023 | Kuriki et al. | |
| 2024/0204270 | A1 | 6/2024 | Kim et al. | |
| 2024/0413404 | A1* | 12/2024 | Sung .................. | H01M 10/446 |
| 2025/0096328 | A1 | 3/2025 | Kim et al. | |

FOREIGN PATENT DOCUMENTS

| | | |
|---|---|---|
| CN | 101308943 A | 11/2008 |
| CN | 112928349 A | 6/2021 |
| CN | 114552037 A | 5/2022 |
| CN | 114583151 A | 6/2022 |
| EP | 4064400 A1 | 9/2022 |
| JP | 2013037879 A | 2/2013 |

(Continued)

OTHER PUBLICATIONS

Keil (P. Keil & A Jossen; "Charging protocols for lithium-ion batteries and their impact on cycle life . . . ", Journal of Energy Storage vol. 6, May 2016, pp. 125-141) (Year: 2016).*
International Search Report for Application No. PCT/KR2023/021138 mailed Mar. 27, 24, pp. 1-3. [See p. 2, categorizing the cited references].

(Continued)

*Primary Examiner* — Jeremiah R Smith

(74) *Attorney, Agent, or Firm* — Lerner David LLP

(57) ABSTRACT

A method for manufacturing a lithium secondary battery includes preparing a battery cell, charging and discharging the battery cell under pressurization to activate the battery, and then charging is performed in a constant voltage mode. The battery cell includes a positive electrode, a negative electrode and an electrolyte, with the positive electrode containing lithium-rich manganese-based oxide in which the content of manganese in all metals excluding lithium is greater than 50 mol %, and the ratio of the number of moles of lithium to the number of moles of all metals excluding lithium (Li/Me) is greater than 1. The charging and discharging the battery cell under pressurization activates the battery. In the activating, the charging is performed in constant current mode until the charge cut-off voltage, and then the charging is performed in a constant voltage mode, and the charge cut-off voltage is greater than 4.35V.

19 Claims, 1 Drawing Sheet

(56)          References Cited

FOREIGN PATENT DOCUMENTS

| JP | 2016051504 | A | 4/2016 |
|----|------------|-----|---------|
| JP | 7064940 | B2 | 5/2022 |
| KR | 20070012213 | A | 1/2007 |
| KR | 101629482 | B1 | 6/2016 |
| KR | 101804492 | B1 | 1/2018 |
| KR | 20190033026 | A | 3/2019 |
| KR | 20190064285 | A | 6/2019 |
| KR | 20200129518 | A | 11/2020 |
| KR | 20210142485 | A | 11/2021 |
| KR | 20220000298 | A | 1/2022 |
| KR | 20220066470 | A | 5/2022 |
| KR | 102468695 | B1 | 11/2022 |
| KR | 20220163857 | A | 12/2022 |
| WO | 2016046868 | A1 | 3/2016 |
| WO | 2020226285 | A1 | 11/2020 |
| WO | 2021065333 | A1 | 4/2021 |
| WO | 2022255638 | A1 | 12/2022 |

OTHER PUBLICATIONS

Extended European Search Report including Written Opinion for Application No. 23907747.2 dated Jan. 2, 2026. 10 pages.

* cited by examiner

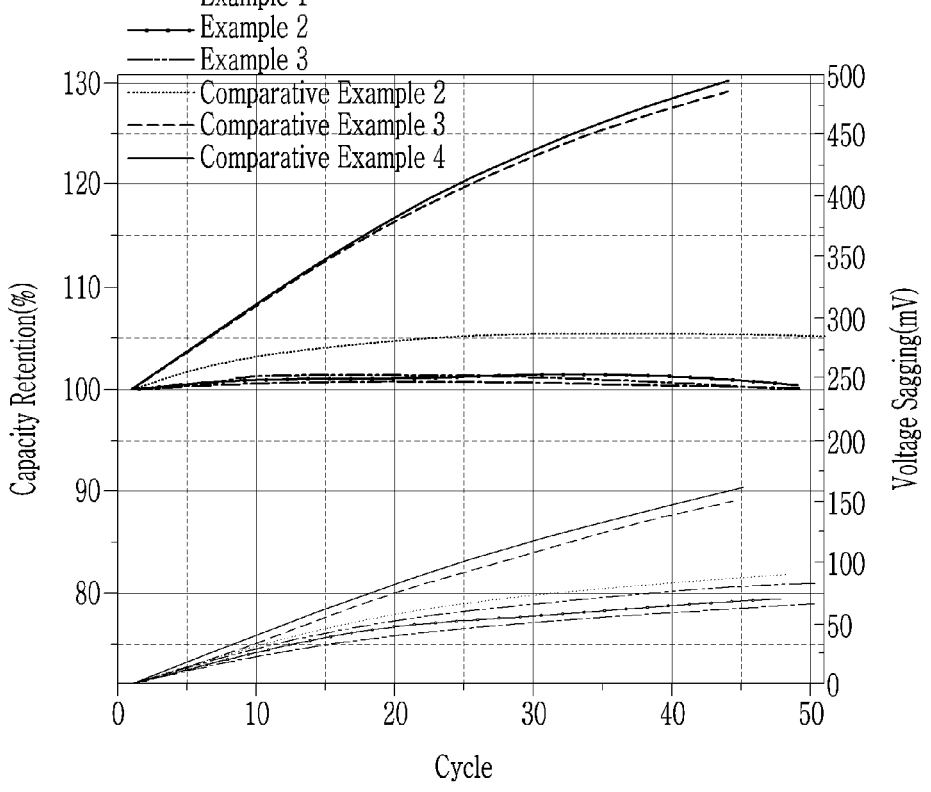

METHOD FOR MANUFACTURING LITHIUM SECONDARY BATTERY COMPRISING LITHIUM-RICH MANGANESE BASED OXIDE

CROSS-REFERENCE TO RELATED APPLICATION

The present application claims priority to Korean Patent Application No. 10-2022-0183684 filed on Dec. 23, 2022, the disclosure of which is incorporated by reference herein.

TECHNICAL FIELD

The present disclosure relates to a method for manufacturing a lithium secondary battery comprising lithium-rich manganese based oxide, and more particularly, to a method for manufacturing a lithium secondary battery comprising lithium-rich manganese based oxide that can suppress abnormal capacity increase and gas generation during battery operation

BACKGROUND

Lithium secondary batteries are energy storage media that have been applied in various fields since they were commercially introduced in 1991. As the market for products equipped with lithium secondary batteries expands, research to increase the energy density of lithium secondary batteries has been actively conducted. One of the methods that is attracting the most attention is developing a positive electrode active material with a composition that can utilize a larger amount of lithium than before.

As a positive electrode active material that can utilize a larger amount of lithium, lithium-rich transition metal oxide having a layered structure and having a molar ratio of lithium to transition metal of more than 1 have been developed. Since such conventional lithium-rich transition metal oxide achieves capacity by simultaneously utilizing not only the cation redox reaction of the transition metal but also the anion redox reaction using oxygen in the positive electrode structure, they cannot achieve high capacity. Typical lithium-rich transition metal oxides currently being actively studied include lithium-rich manganese-based oxides in which the molar ratio of lithium to transition metal is greater than 1 and the content of manganese in the total transition metal is 50 mol % or more. The lithium-rich manganese-based oxides have a structure in which $LiMO_2$ (where M is a transition metal) having a layered structure, and $Li_2MnO_3$ having a rock salt structure are mixed, and the activation process is performed at a high voltage of 4.4V or higher, so that $Li_2MnO_3$ can be activated to achieve high capacity. However, there is a problem that during this high-voltage activation process, oxygen desorption occurs, so that excessive gas is generated and elution of transition metals such as manganese occur. Lowering the activation voltage can reduce the amount of gas generated during the activation process, but in this case, it can cause a problem such as activating the $Li_2MnO_3$ phase remaining in the crystal structure during the battery operation process, causing abnormal behavior in which the capacity increases abnormally, and generating additional gas.

DETAILED DESCRIPTION OF THE INVENTION

Technical Problem

The present disclosure has been made to solve the above problems, and it is therefore an object of the present disclosure to provide a method for manufacturing a lithium secondary battery using lithium-rich manganese-based oxide that can suppress abnormal capacity increase and gas generation during battery operation by performing activation under specific conditions.

Technical Solution

According to the present disclosure, there is provided a method for manufacturing a lithium secondary battery, the method comprising the steps of: preparing a battery cell including a positive electrode, a negative electrode and an electrolyte, with the positive electrode containing lithium-rich manganese-based oxide in which the content of manganese in all metals excluding lithium is greater than 50 mol %, and the ratio of the number of moles of lithium to the number of moles of all metals excluding lithium (Li/Me) is greater than 1; and charging and discharging the battery cell under pressurization to activate the battery, wherein in the activating step, the charging is performed in constant current mode until the charge cut-off voltage, and then the charging is performed in a constant voltage mode, and the charge cut-off voltage is greater than 4.35V. In some embodiments, the charging in constant-current mode may be performed so as to include at least a part of the potential plateau section that appears during constant current mode charging, and the cut-off current during constant current mode charging may be 0.01 C to 0.15 C.

On the other hand, in the activating step, the charging may comprise a first charging step of performing constant current charging at a first current rate, and a second charging step of performing constant current charging at a second current rate different from the first current rate and then performing constant voltage charging. In some embodiments, the first current rate and the second current rate may be each independently 0.1 C to 1.0 C.

In some embodiments, the first charging step may be performed until the SOC of the battery cell reaches 30 to 60, and the second charging step may be performed after the first charging step, that is, from SOC 30-60 to SOC 90~100.

The activating step may be preferably performed while mounting the battery cell on a jig and pressurizing it.

Further, the activating step may be performed while changing the pressurization pressure. For example, the activating step may include performing charging under a pressurization pressure $P_1$ until the SOC of the battery cell reaches 10 to 20, and then performing charging and discharging under a pressurization pressure $P_2$. The pressurization pressure $P_1$ and the pressurization pressure $P_2$ may satisfy the following Equation (1):

$$5P_1 \leq P_2 \leq 15P_1 \qquad \text{Equation (1)}$$

In some embodiments, when the charging curve area in the voltage range of 4.3V to 4.6V is indicated as A in a dQ/dV graph obtained by differentiating a graph of a voltage V and a battery charging capacity Q measured while charging the battery cell to 4.6V, and the charging curve area in the range of 4.3V to a charge cut-off voltage is indicated as B in a dQ/dV graph obtained by differentiating a graph of a voltage V and a battery charge capacity Q measured while charging the battery cell to the charge cut-off voltage of the activating step, it is preferable that the following Equation (2) is satisfied.

$$0.5A \le B \le A \qquad \text{Equation (2)}$$

In some embodiments, the lithium-rich manganese-based oxide may be represented by the following Chemical Formula 1.

$$Li_aNi_bCo_cMn_dM_eO_2 \qquad \text{[Chemical Formula 1]}$$

wherein, in Chemical Formula 1, $1<a$, $0\le b\le0.5$, $0\le c\le0.1$, $0.5\le d\le1.0$, and $0\le e\le0.2$, and M may include at least one selected from the group consisting of Al, B, Co, W, Mg, V, Ti, Zn, Ga, In, Ru, Nb, Sn, Sr and Zr, preferably $1.1\le a\le1.5$, $0.1\le b\le0.4$, $0\le c\le0.05$, $0.5\le d\le0.80$, and $0\le e\le0.1$

Advantageous Effects

In the method for manufacturing a lithium secondary battery according to the present disclosure, the activating step is performed under pressurization and charging is performed in constant current-constant voltage mode, thereby facilitating gas discharge, minimizing the non-activated $Li_2MnO_3$ phase, and preventing lithium precipitation and abnormal behavior generation during battery operation.

BRIEF DESCRIPTION OF THE DRAWINGS

FIGURE is a graph showing the cycle characteristics of lithium secondary batteries activated by the methods of Examples 1 to 3 and Comparative Examples 1 to 4.

DETAILED DESCRIPTION

Terms or words used in the specification and the appended claims should not be construed as limited to ordinary or dictionary meanings, and the terms and words should be construed with meanings and concepts that are consistent with the technical idea of the present technology based on the principle that the inventors may appropriately define concepts of the terms to appropriately describe their own technology in the best way.

In the present disclosure, 'primary particle' refers to a particle unit in which grain boundaries do not appear to exist when observed with the field of view of 5000 to 20000 magnification using a scanning electron microscope. "Average particle size of primary particles" refers to the arithmetic average value of primary particles observed in a scanning electron microscope image calculated after measuring their particle sizes.

In the present disclosure, 'secondary particle' is a particle formed by agglomerating a plurality of primary particles.

In the present disclosure, the average particle size $D_{50}$ means a particle size at which cumulative volumes of powder particles (e.g., positive electrode active material, negative electrode active material, etc.) reach 50% in the particle size distribution curve of the particles. The $D_{50}$ can be measured using a laser diffraction method. It can be measured by a process which includes dispersing the powder of particles to be measured in a dispersion medium, introducing it into a commercially available laser diffraction particle size measurement device (e.g., Microtrac MT 3000), irradiating it with ultrasound of about 28 kHz with the output power of 60 W to obtain a volume cumulative particle size distribution, and determining the particle size corresponding to 50% of cumulative volume.

In the present disclosure, "SOC X" refers to a state where "X" is the percentage (%) of the capacity charged in the battery cell relative to the discharge capacity, (i.e., (charge capacity/discharge capacity of the battery cell in the voltage range of 4.6 to 2.0V)×100), that appears when the battery cell is discharged from 4.6 V to 2.0 V.

The present inventors have conducted repeated research to improve the phenomenon in which the capacity increases abnormally and the amount of gas generated increases during operation of a lithium secondary battery using lithium-rich manganese oxide, and as a result, found that this phenomenon can be improved by performing an activating step under specific conditions when manufacturing a lithium secondary battery.

Some embodiments will be described in detail below.

The method for manufacturing a lithium secondary battery according to the present disclosure comprises (1) a step of preparing a battery-cell including a positive electrode, a negative electrode and an electrolyte, and (2) a step of charging and discharging the battery cell under pressurization to activate the battery, wherein in the activating step, the charging is performed in constant current mode until the charge cut-off voltage, and then the charging is performed in a constant voltage mode, and the charge cut-off voltage is greater than 4.35V.

(1) Step of Preparing Battery Cell

First, a battery cell including a positive electrode, a negative electrode, and an electrolyte is prepared.

The battery cell can be prepared, for example, by preparing an electrode assembly including a positive electrode and a negative electrode, storing the electrode assembly in a battery case, and then injecting an electrolyte to seal a battery case. At this time, the electrode assembly may include a separator between the positive electrode and the negative electrode.

The electrode assembly may be various forms of electrode assemblies well known in the art, for example, a jelly-roll type, a stacked type, a stacked and laminated type, or a stack and folding type electrode assembly, and the form thereof is not particularly limited.

The jelly-roll type electrode assembly can be produced by interposing a sheet-shaped separator between a sheet-shaped positive electrode and a sheet-shaped negative electrode and then winding it in one direction.

The stacked type electrode assembly can be produced by cutting a positive electrode, a separator and a negative electrode into a desired shape and then sequentially stacking the cut positive electrode/separator/negative electrode.

The stacked and laminated type electrode assembly can be produced by a method of stacking a positive electrode, a separator and a negative electrode to produce a plurality of unit cells, stacking the plurality of unit cells with a separator interposed therebetween, and then laminating them through a method such as heating.

The stack and folding type electrode assembly can be produced by a method of stacking a positive electrode, a separator and a negative electrode to produce a plurality of unit cells, arranging the plurality of unit cells on one surface or both side surfaces of a long folding separator and then winding the folding separator.

On the other hand, as the battery case, various battery cases known in the art, for example, a cylindrical battery case, a prismatic battery case, or a pouch-type battery case, and the like can be used, and the type thereof is not particularly limited.

On the other hand, the positive electrode according to some embodiments is a positive electrode active material, which includes lithium-rich manganese-based oxide in which the content of manganese in all metals (Me), excluding lithium, is greater than 50 mol %, and the ratio of the number of moles of lithium to the number of moles of all metals excluding lithium (Li/Me) is greater than 1. Specifically, the positive electrode according to some embodiments may include a positive electrode current collector, and a positive electrode active material layer disposed on at least one surface of the positive electrode current collector, wherein the positive electrode active material layer includes a lithium-rich manganese-based oxide in which the ratio of the number of moles of lithium to the number of moles of all metals excluding lithium (Li/Me) is greater than 1.

In the case of lithium-rich manganese oxide containing surplus lithium, it has a structure of layered phase ($LiM'O_2$) and rock-salt phase ($Li_2MnO_3$) are mixed. During the initial activation process, the rock-salt phase is activated and excessive lithium ions are generated, thereby achieving high capacity.

Preferably, the lithium-rich manganese-based oxide may be represented by the following Chemical Formula 1:

$$Li_aNi_bCo_cMn_dM_eO_2 \qquad \text{[Chemical Formula 1]}$$

wherein, in Chemical Formula 1, M may be at least one selected from the group consisting of Al, B, Co, W, Mg, V, Ti, Zn, Ga, In, Ru, Nb, Sn, Sr and Zr.

a is the molar ratio of Li in the lithium-rich manganese-based oxide, and may be $1<a$, $1.1\leq a\leq1.5$, or $1.1\leq a\leq1.3$. If a is within the above range, the irreversible capacity of the silicon-based negative active material can be sufficiently compensated, and high capacity characteristics can be realized.

b is the molar ratio of Ni in the lithium-rich manganese-based oxide, and may be $0\leq b\leq0.5$, $0.1\leq b\leq0.4$, or $0.2\leq b\leq0.4$.

c is the molar ratio of Co in the lithium-rich manganese-based oxide, and may be $0\leq c\leq0.1$, $0\leq c\leq0.08$, or $0\leq c\leq0.05$. If c exceeds 0.1, it is difficult to secure high capacity, and gas generation and deterioration of the positive electrode active material become intensified, and the life characteristics may deteriorate.

d is the molar ratio of Mn in the lithium-rich manganese oxide, and may be $0.5\leq d<1.0$, $0.50\leq d\leq0.80$, or $0.50\leq d\leq0.70$. If d is less than 0.5, the proportion of the rock-salt phase becomes too small, so the effects of negative electrode irreversibility compensation and capacity improvement are slight.

e is the molar ratio of the doping element M in the lithium-rich manganese-based oxide, and may be $0\leq e\leq0.2$, $0\leq e\leq0.1$, or $0\leq e\leq0.05$. If the content of the doping element is too high, it may have an adverse effect on the capacity of the active material.

In some embodiments, in the lithium-rich manganese-based oxide represented by Chemical Formula 1, the ratio of the number of moles of Li to the number of moles of all metal elements excluding Li (Li/Me) may be 1.2 to 1.5, 1.25 to 1.5, or 1.25 to 1.4. When the Li/Me ratio satisfies the above range, rate characteristics and capacity characteristics are excellently exhibited. If the Li/Me ratio is too high, electrical conductivity may decrease and the rock-salt phase ($Li_2MnO_3$) may increase, which may increase the degradation rate. If the Li/Me ratio is too low, the effect of improving energy density is slight.

In some embodiments, the composition of the lithium-rich manganese-based oxide may be represented by the following Chemical Formula 2:

$$X\ Li_2MnO_3\cdot(1-X)Li[Ni_{1-y-z-w}Mn_yCo_zM_w]O_2 \qquad \text{[Chemical Formula 2]}$$

wherein, in Chemical Formula 2, M may be at least one metal ion selected from the group consisting of Al, B, Co, W, Mg, V, Ti, Zn, Ga, In, Ru, Nb, Sn, Sr, and Zr.

X refers to the ratio of the $Li_2MnO_3$ phase in the lithium-rich manganese-based oxide, and may be $0.2\leq X\leq0.5$, $0.25\leq X\leq0.5$, or $0.25\leq X\leq0.4$. When the ratio of the $Li_2MnO_3$ phase in the lithium-rich manganese-based oxide satisfies the above range, the irreversible capacity of the silicon-based negative electrode active material can be sufficiently compensated, and high capacity characteristics can be realized.

y is the molar ratio of Mn on the $LiM'O_2$ layer, and may be $0.4\leq y<1$, $0.4\leq y\leq0.8$, or $0.4\leq y\leq0.7$.

z is the molar ratio of Co in the $LiM'O_2$ layer, and may be $0\leq z\leq0.1$, $0\leq z\leq0.08$, or $0\leq z\leq0.05$. If z is greater than 0.1, gas generation and deterioration of the positive electrode active material may become intensified, and the life characteristics may deteriorate.

w is the molar ratio of the doping element M on the $LiM'O_2$ layer, and may be $0\leq w\leq0.2$, $0\leq w\leq0.1$, or $0\leq w\leq0.05$.

In some embodiments, the positive electrode active material according to some embodiments may further include a coating layer on the surface of the lithium-rich manganese-based oxide, if necessary. When the positive electrode active material includes a coating layer, contact between the lithium-rich manganese oxide and the electrolyte is suppressed by the coating layer, and side reactions of the electrolyte are reduced, thereby obtaining the effect of improving the life characteristics The coating layer may include a coating element $M^1$, and the coating element $M^1$ may be, for example, at least one selected from the group consisting of Al, B, Co, W, Mg, V, Ti, Zn, Ga, In, Ru, Nb, Sn, Sr, and Zr, preferably, Al, Co, Nb, W, and a combination thereof, and more preferably, Al, Co, and a combination thereof. The coating element $M^1$ may include two or more types, for example, Al and Co.

The coating element may be present in the coating layer, in an oxide form, i.e., $M^1O_z$ ($1\leq z\leq4$).

The coating layer can be prepared through methods such as dry coating, wet coating, chemical vapor deposition (CVD), physical vapor deposition (PVD), and atomic layer deposition (ALD). Among these, it is preferable to prepare it through atomic layer deposition in that the coating layer can be formed to have a wider area.

The area where the coating layer has formed ('formation area of the coating layer') may be 10 to 100%, preferably 30 to 100%, and more preferably 50 to 100%, based on the total surface area of the lithium-rich manganese-based oxide particles. When the formation area of the coating layer satisfies the above range, the effect of improving life characteristics is excellent.

The positive electrode active material according to some embodiments may be in the form of secondary particles in which a plurality of primary particles are agglomerated, and the average particle size $D_{50}$ of the secondary particles may be 2 microns to 10 microns, preferably 2 microns to 8 microns, and more preferably 4 microns to 8 microns. When the $D_{50}$ of the positive electrode active material satisfies the above range, the electrode density can be excellently achieved, and degradation of capacity and rate characteristics can be minimized.

Further, the positive electrode active material may have a BET specific surface area of 1 m$^2$/g~10 m$^2$/g, 3~8 m$^2$/g or 4~6 m$^2$/g. If the BET specific surface area of the positive electrode active material is too low, the reaction area with the electrolyte is insufficient, which makes it difficult to achieve sufficient capacity. If the specific surface area is too high, moisture absorption is rapid and side reactions with electrolytes are accelerated, which makes it difficult to secure life characteristics.

The lithium-rich manganese-based oxide can be produced by mixing a transition metal precursor and a lithium raw material and then firing the mixture.

As the lithium raw material, for example, lithium-containing carbonates (e.g., lithium carbonate, etc.), hydrates (e.g., lithium hydroxide hydrate (LiOH·H$_2$O), etc.), hydroxides (e.g., lithium hydroxide, etc.), nitrates (e.g., lithium nitrate (LiNO$_3$), etc.), chlorides (e.g., lithium chloride (LiCl), etc.), and the like can be used, and among these, one type alone or a mixture of two or more types can be used.

In some embodiments, the transition metal precursor may be in the form of hydroxides, oxides, or carbonates. When the carbonate form of the precursor is used, it is more preferable in that a positive electrode active material with a relatively high specific surface area can be produced.

The transition metal precursor can be prepared by a co-precipitation process. For example, the transition metal precursor can be prepared by dissolving each transition metal-containing raw material in a solvent to prepare a metal solution, then mixing the metal solution, an ammonium cation complex forming agent, and a basic compound, and proceeding with a coprecipitation reaction. Further, if necessary, an oxidizing agent or oxygen gas may be further added during the coprecipitation reaction.

At this time, the transition metal-containing raw material may be acetate, carbonate, nitrate, sulfate, halide, sulfide, and the like of each transition metal. Specifically, the transition metal-containing raw material may be NiO, NiCO$_3$·2Ni(OH)$_2$·4H$_2$O, NiC$_2$O$_2$·2H$_2$O, Ni(NO$_3$)$_2$·6H$_2$O, NiSO$_4$, NiSO$_4$·6H$_2$O, Mn$_2$O$_3$, MnO$_2$, Mn$_3$O$_4$ MnCO$_3$, Mn(NO$_3$)$_2$, MnSO$_4$·H$_2$O, manganese acetate, manganese halide, cobalt sulfate, cobalt nitrate, cobalt carbonate, cobalt oxide, cobalt acetate, cobalt halide, and the like.

The ammonium cation complex forming agent may be at least one selected from the group consisting of NH$_4$OH, (NH$_4$)$_2$SO$_4$, NH$_4$NO$_3$, NH$_4$Cl, CH$_3$COONH$_4$, and NH$_4$CO$_3$.

The basic compound may be at least one selected from the group consisting of NaOH, Na$_2$CO$_3$, KOH, and Ca(OH)$_2$. The form of the precursor may vary depending on the type of the basic compound used. For example, when NaOH is used as a basic compound, a hydroxide form of the precursor can be obtained, and when Na$_2$CO$_3$ is used as a basic compound, a carbonate form of the precursor can be obtained. Further, when a basic compound and an oxidizing agent are used together, an oxide form of the precursor can be obtained.

In some embodiments, the transition metal precursor and the lithium raw material can be mixed in an amount such that the molar ratio of total transition metals (Ni+Co+Mn):Li is 1:1.05 to 1:2, preferably 1:1.1 to 1:1.8, and more preferably 1:1.25 to 1:1.8.

In some embodiments, the firing may be performed at a temperature of 600° C. to 1000° C. or 700° C. to 950° C., and the firing time may be 5 hours to 30 hours or 5 hours to 20 hours. Further, the firing atmosphere may be an air atmosphere or an oxygen atmosphere, for example, an atmosphere containing oxygen at 20 to 100% by volume.

In some embodiments, the positive electrode active material layer may further include a conductive material and a binder in addition to the positive electrode active material.

Examples of the conductive material include spherical or flaky graphite; carbon-based material such as carbon black, acetylene black, ketjen black, channel black, furnace black, lamp black, thermal black, carbon fiber, single-wall carbon nanotubes, and multi-wall carbon nanotubes; metal powders or metal fibers such as copper, nickel, aluminum, and silver; conductive whiskers such as zinc oxide and potassium titanate; conductive metal oxides such as titanium oxide; or conductive polymers such as polyphenylene derivatives, and the like. Among these, one type alone or a mixture of two or more types can be used. The conductive material can be contained in an amount of 0.1 to 20% by weight, 1 to 20% by weight, or 1 to 10% by weight based on the total weight of the positive electrode active material layer.

Further, the binder may include polyvinylidenefluoride (PVDF), a polyvinylidenefluoride-hexafluoropropylene copolymer (PVdF-co-HFP), polyvinyl alcohol, polyacrylonitrile, carboxymethylcellulose (CMC), starch, hydroxypropylcellulose, regenerated cellulose, polyvinylpyrrolidone, polytetrafluoroethylene, polyethylene, polypropylene, ethylene-propylene-diene monomer rubber (EPDM rubber), sulfonated-EPDM, styrene-butadiene rubber (SBR), fluorine rubber, and various copolymers thereof. Among these, one type alone or a mixture of two or more types can be used. The binder may be contained in an amount of 1 to 20% by weight, 2 to 20% by weight, or 2 to 10% by weight based on the total weight of the positive electrode active material layer.

Next, the negative electrode may include, for example, a negative electrode current collector and a negative electrode active material layer located on the negative electrode current collector. The negative electrode active material layer may optionally include a binder and a conductive material along with the negative electrode active material.

The negative electrode current collector is not particularly limited as long as it has high conductivity without causing a chemical change in the battery, and, for example, copper, stainless steel, aluminum, nickel, titanium, fired carbon, or copper or stainless steel of which surface is treated with carbon, nickel, titanium, silver, or the like, an aluminum-cadmium alloy, or the like can be used. Further, the negative electrode current collector may generally have a thickness of 3 microns to 500 microns. Also, similar to the positive electrode current collector, the negative electrode current collector may have fine protrusions and depressions formed on a surface thereof to enhance adherence of a negative electrode active material. For example, the negative electrode current collector may be used in various forms such as a film, a sheet, a foil, a net, a porous body, a foaming body, and a non-woven fabric structure.

As the negative electrode active material, a compound capable of reversible intercalation and deintercalation of lithium can be used. Specific examples of the negative electrode active material may include a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, Si alloy, Sn alloy, or Al alloy; metal oxides capable of doping and de-doping lithium, such as SiO$_\beta$ (0<$\beta$<2), SnO$_2$, vanadium oxide, and lithium vanadium oxide; a composite containing the metallic compound and the carbonaceous material, such as Si—C composite or Sn—C composite, and any one alone or a mixture of two or more thereof can be used.

Further, a metallic lithium thin film may be used as the negative electrode active material. Further, both low-crystalline carbon and highly-crystalline carbon can be used as the carbon material. Typical examples of the low-crystalline carbon include soft carbon and hard carbon. Typical examples of the highly-crystalline carbon include amorphous, plate-like, flaky, spherical or fibrous natural graphite or artificial graphite, kish graphite, pyrolytic carbon, mesophase pitch-based carbon fiber, meso-carbon microbeads, high-temperature sintered carbon such as mesophase pitches and petroleum or coal tar pitch derived cokes.

The conductive material is used to impart conductivity to the electrode, and the conductive material can be used without particular limitation as long as it has electronic conductivity without causing chemical changes in the battery to be configured. Specific examples thereof include graphite such as natural graphite and artificial graphite; carbon-based materials such as carbon black, acetylene black, ketjen black, channel black, furnace black, lamp black, thermal black, carbon fiber, and carbon nanotube; metal powder or metal fibers such as copper, nickel, aluminum and silver; conductive whiskey such as zinc oxide and potassium titanate; conductive metal oxides such as titanium oxide; or a conductive polymer such as a polyphenylene derivative, and any one type alone or a mixture of two or more types of them can be used. The conductive material may typically be contained in an amount of 1 to 30% by weight, preferably 1 to 20% by weight, and more preferably 1 to 10% by weight, based on the total weight of the negative electrode active material layer.

The binder performs the role of improving adhesion between negative electrode active material particles and an adhesive force between the negative electrode active material and the negative electrode current collector. Specific examples thereof include polyvinylidene fluoride (PVDF), a vinylidene fluoride-co-hexafluoropropylene copolymer (PVDF-co-HFP), polyvinyl alcohol, polyacrylonitrile, carboxymethyl cellulose (CMC), starch, hydroxypropylcellulose, regenerated cellulose, polyvinyl pyrrolidone, polytetrafluoroethylene, polyethylene, polypropylene, an ethylene-propylene-diene monomer (EPDM), a sulfonated EPDM, styrene butadiene rubber (SBR), fluoro rubber, or various copolymers thereof, and any one type alone or a mixture of two or more types of them can be used. The binder may be contained in an amount of 1 to 30% by weight, preferably 1 to 20% by weight, and more preferably 1 to 10% by weight, based on the total weight of the negative electrode active material layer.

The negative electrode active material layer may be prepared by coating a negative electrode slurry containing a negative electrode active material and optionally a binder and a conductive material onto a negative electrode current collector, and drying the coated slurry, or may be prepared by casting the negative electrode slurry on a separate support and then laminating a film peeled from the support on the current collector.

Next, the separator separates the negative electrode and the positive electrode from each other, and provides a moving passage for lithium ions. The separator can be used without particular limitation as long as it is used as a separator in a typical lithium secondary battery. Particularly, it is preferable that the separator has a low resistance against the ion migration of the electrolyte and has an excellent ability to impregnate the electrolyte. Specifically, the separator may be a porous polymer film, for example, a porous polymer film made of a polyolefin-based polymer such as an ethylene homopolymer, a propylene homopolymer, an ethylene/butene copolymer, an ethylene/hexene copolymer and an ethylene/methacrylate copolymer, or a laminated structure of two or more layers thereof. Further, a typical porous nonwoven fabric, for example, a nonwoven fabric made of a glass fiber having a high melting point, a polyethylene terephthalate fiber or the like can be used. In addition, in order to secure heat resistance or mechanical strength, a coated separator containing a ceramic ingredient or a polymer material can be used, and may be optionally used as a single layer or multilayer structure.

Next, the electrolyte used herein may include various electrolytes that can be used in lithium secondary batteries, such as an organic liquid electrolyte, an inorganic liquid electrolyte, a solid polymer electrolyte, a gel-type polymer electrolyte, a solid inorganic electrolyte, a melt-type inorganic electrolyte, or a combination thereof, and the type thereof is not particularly limited.

For example, the electrolyte may include an organic solvent and a lithium salt.

The organic solvent can be used without any particular limitation as long as it serves as a medium through which ions involved in the electrochemical reaction of the battery may migrate. Specific examples of the organic solvent may include an ester-based solvent such as methyl acetate, ethyl acetate, $\gamma$-butyrolactone, or $\varepsilon$-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methylethylcarbonate (MEC), ethylmethyl carbonate (EMC), ethylene carbonate (EC), or propylene carbonate (PC); an alcohol-based solvent such as ethyl alcohol or isopropyl alcohol; nitriles such as R—CN (wherein R is a linear, branched or cyclic hydrocarbon group having 2 to 20 carbon atoms, and may include a double bond aromatic ring or ether bond); amides such as dimethylformamide; dioxolanes such as 1,3-dioxolane; sulfolane; or the like.

The lithium salt can be used without any particular limitation as long as it is a compound capable of providing lithium ions used in the lithium secondary battery. Specifically, the anion of the lithium salt may be at least one selected from the group consisting of $F^-$, $Cl^-$, $Br^-$, $I^-$, $NO_3^-$, $N(CN)_2^-$, $BF_4^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, and the lithium salt that can be used herein may be $LiPF_6$, $LiN(FSO_2)_2$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. $LiCl$, $LiI$, $LiB(C_2O_4)_2$ or the like. The concentration of the lithium salt may be preferably used within the range of 0.1 to 5.0M.

In order to improve the life characteristics of the battery, suppress the decrease of the battery capacity, improve the discharging capacity of the battery, etc., in addition to the above electrolyte ingredients, the electrolyte may further include an additive. For example, as the additive, a haloalkylene carbonate-based compound such as difluoroethylene carbonate; pyridine; triethylphosphite; triethanolamine; cyclic ether; ethylene diamine; n-glyme; hexaphosphoric triamide; nitrobenzene derivatives; sulfur; quinone imine dyes; N-substituted oxazolidinones; N,N-substituted imidazolidine; ethylene glycol dialkyl ether; ammonium salt; pyrrole; 2-methoxy ethanol; aluminum trichloride; or the like can be used alone or in combination, but are not limited thereto. The additive may be contained in an amount of 0.1 to 10% by weight, preferably 0.1 to 5% by weight, based on the total weight of the electrolyte.

(2) Activating Step

Next, a step of charging and discharging the battery-cell at least once under pressurization to electrically activate the battery is performed. The activating step is a step of charging and discharging the battery cell to impart electrical properties and forming a SEI (Solid Electrolyte Interphase) film on the electrodes to stabilize the battery.

In some embodiments, the charging and discharging of the activating step is performed under pressurization. At this time, the pressurization can be performed, for example, by mounting the battery cell on a jig and then applying pressure to the battery cell via the jig. This may be referred to as the jig-formation process. In the case of battery cells that apply lithium-rich manganese oxide, excessive gas is generated during the activating step, and if the gas is not discharged smoothly, lithium precipitation may be induced by a gas trap, or activation may occur unevenly, and thus, cell performance may deteriorate. Therefore, in some embodiments, the activating step is performed under pressurization to prevent the occurrence of gas traps throughout the battery cell and allow the electrolyte to be properly impregnated, which enables the $Li_2MnO_3$ phase to be activated uniformly at high voltage, thereby preventing generation of abnormal behavior during battery operation. The pressurization can be performed at a pressure of 0.1 kgf to 10 kgf, preferably 0.1 kgf to 8 kgf, and more preferably 0.2 kgf to 7 kgf. When the pressurization pressure condition satisfies the above range, damage to the battery cells can be prevented, and the effects of improving gas discharge and electrolyte impregnation properties are more excellently exhibited.

In some embodiments, the activating step can be performed while changing the pressurization pressure, if necessary. For example, in the initial stage of charging in the activating stage (e.g., SOC 20 or less), the pressurization is performed at a relatively low pressure to ensure that the electrolyte is abundantly present on the electrode interface, so that the SEI film can be stably formed. At the point when the amount of gas generated due to film formation increases (e.g., after SOC 20), charging can be performed while increasing the pressing pressure to remove gas from the electrode interface. Charging can be performed under relatively high pressurization pressure. When the activating step is performed while changing the pressurization pressure in this way, the gas discharge effect can be maximized while minimizing deformation or damage to the battery cell due to pressurization, and charging can be performed at a relatively high current rate, so that the effect of reducing the time of the activating step can be obtained.

More specifically, the activating step may include performing charging under a pressurization pressure $P_1$ until the SOC of the battery cell reaches 10 to 20, and then performing charging and discharging under a pressurization pressure $P_2$. At this time, it is preferable that the $P_1$ and $P_2$ satisfy the conditions of the following Equation (1):

$$5P_1 \le P_2 \le 15P_1 \qquad \text{Equation (1)}$$

When $P_1$ and $P_2$ satisfy the conditions of Equation (1), the gas discharge effect can be maximized, and charging can be performed at a relatively high current rate, which has the effect of reducing the time of the activating step.

Some embodiments of the present disclosure is characterized by performing the charging in constant current mode until the charge cut-off voltage during charging in the activating step, and then performing the charging in constant voltage mode. The charging is performed in a constant current-constant voltage mode as in some embodiments of the present disclosure, so that the non-activated $Li_2MnO_3$ phase can be minimized, thereby preventing generation of abnormal behavior during battery operation.

When charging in the constant voltage mode, the charge cut-off current rate may be 0.01 C to 0.15 C, preferably 0.03 C to 0.10 C, and more preferably 0.03 C to 0.06 C. If charging in constant voltage mode is terminated too early, the activation may not proceed sufficiently, and if charging in constant voltage mode is terminated too late, the time of the activation step may increase, and the production speed may decrease.

The charge cut-off voltage during charging may be greater than 4.35V, for example, 4.4V to 4.8V, 4.4V to 4.7V, or 4.4V to 4.6V. If the charge cut-off voltage is 4.35V or less, $Li_2MnO_3$ is not sufficiently activated, which makes it difficult to achieve high capacity, and abnormal behavior in which the capacity increases during battery operation may occur.

In some embodiments, the constant current charging is preferably performed so as to include at least part of the potential plateau section (4.4V to 4.6V). In the case of batteries that apply lithium-rich manganese-based oxide, a potential plateau section where the voltage remains relatively constant in the voltage range of 4.4V to 4.6V appears in the voltage profile depending on the charging rate. When charging is performed so as to include at least a part of the potential plateau section during constant current charging, lithium-rich manganese-based oxide is activated so that high capacity characteristics can be achieved. If the potential plateau section is not included during activation charging, the $Li_2MnO_3$ phase is not sufficiently activated, so that the capacity increase effect is slight, and abnormal behavior may occur during cycling.

More specifically, the charge cut-off voltage may be set to satisfy the following Equation (2):

$$0.5A \le B \le A \qquad \text{Equation (2)}$$

wherein, in Equation (2), A is the charging curve area in the voltage range of 4.3V to 4.6V in a dQ/dV graph obtained by differentiating a graph of a voltage V and a battery charging capacity Q measured while charging the battery cell to 4.6V, and B is the charging curve area in the range of 4.3V to a charge cut-off voltage in a dQ/dV graph obtained by differentiating a graph of a voltage V and a battery charge capacity Q measured while charging the battery cell to the charge cut-off voltage of the activating step.

When the charge cut-off voltage during activation charging is set to satisfy the Equation (2), high-voltage activation is sufficiently performed, so that capacity can excellently exhibit, and the generation of abnormal behavior due to uneven activation of the $Li_2MnO_3$ phase can be more effectively suppressed.

In some embodiments, charging can include two or more steps with different charge speeds, if necessary. For example, the charging may comprise a first charging step of performing constant current charging at a first current rate, and a second charging step of performing constant current charging at a second current rate different from the first current rate and then performing constant voltage charging.

At this time, the first current rate and the second current rate may each independently be 0.1 C to 1.0 C, preferably 0.1 C to 0.8 C, and more preferably 0.1 C to 0.6 C.

Preferably, the first current rate may be smaller than the second current rate. That is, the first charging step can be performed at a relatively low speed, and the second charging step can be performed at a relatively high speed. If the current rate is fast in the first charging step, a SEI film may be unstably formed on the electrode surface. If the SEI film is unstably formed on the electrode surface, the SEI film is easily decomposed during battery operation, causing rapid deterioration of the electrode, which can significantly reduce life characteristics. However, if the charge rate is too slow, there is a problem that the time of the overall activation step increases and the production speed decreases. However, as in some embodiments of the present disclosure, charging is performed at a low speed in the first charging step, which is the initial stage of charging when the SEI film is formed, and in the second charging step, which is after the SEI film has been formed to some extent, charging is performed at high speed, so that the time of the overall activation step can be reduced while stably forming an SEI film on the electrode surface.

In some embodiments, the first charging step may be performed until the SOC of the battery cell reaches 30 to 60. When the charge capacity in the first charge step satisfies the above range, a strong and dense SEI film is formed on the electrode surface, thereby realizing excellent life characteristics.

In some embodiments, the first charging step may be performed in two or more steps with different rates, if necessary. For example, the first charging step may include a 1-1 charging step in which the battery-cell is charged at a C-rate of 0.1 C to 0.3 C, and a 1-2 charging step in which the battery-cell is charged at a C-rate of 0.3 C to 1.0 C. At this time, the 1-1 charging step may be performed from SOC 0 to SOC 3 to 5, and the first and second charging steps may be performed from SOC 3 to 5 to SOC 30 to 60. When the first charging step is performed in two steps as described above, the charge rate can be kept lower at the initial stage of SEI film formation, thereby forming a more robust and dense SEI film, and subsequently, by increasing the charge rate, oxygen desorption and cation mixing can be suppressed, and the time required for the activation step can be reduced.

In some embodiments, the second charging step is preferably performed after the first charging step, that is, from SOC 30 to 60 to SOC 90 to 100. When the charging capacity in the second charging step satisfies the above range, incomplete formation of the SEI film can be suppressed, and $Li_2MnO_3$ can be sufficiently activated to effectively prevent generation of abnormal behavior during battery operation.

The second charging step is performed in constant current-constant voltage mode, and the current rate (C-rate) during the constant current charging may be 0.1 C to 1.0 C, more preferably 0.3 C to 0.8 C, and more preferably 0.3 C to 0.6 C.

Next, the charged battery-cell is discharged. At this time, the discharging may be performed at a C-rate of 0.1 C to 1 C, preferably 0.3 to 1 C. On the other hand, the discharging may be performed in constant current mode (CC mode), and the discharge cut-off voltage may be 2.0V to 3.0V. In some embodiments, the discharging may be performed when the battery cell is discharged from 4.6 V to 2.0 V, preferably 4.5 V to 2.5 V, further preferably 4 V to 3 V, and more preferably 3.5 V to 3.3 V.

The activating step is preferably performed under temperature conditions of 25° C. to 70° C., preferably 30° C. to 60° C., and more preferably 40° C. to 50° C. When the activating step is performed in the above temperature range, $Li_2MnO_3$ is appropriately activated, thereby being able to achieve high capacity.

Although this is not essential, the activating step may further include an aging step, if necessary. The aging step allows the electrolyte to be uniformly impregnated into the electrode assembly and stabilizes the battery, and may be performed before charging, during charging, and/or after discharging, and may be performed one or more times.

The aging step may be performed at a temperature of, for example, 20° C. to 60° C., 20° C. to 50° C., and preferably 30° C. to 50° C. When aging is performed at the above temperature, electrolyte impregnability and lithium mobility are improved so that activation can be performed more smoothly.

In some embodiments, the activation step may include a gas pocket formation process. In the gas pocket formation process, there is a pocket on one side of the cell, other than where the jig meets the cell body surface (i.e., gas pocket). The pocket may contain the gas generated during the jig-formation process. After the jig-formation process, during the aging and degassing step, the gas is trapped in the gas pocket. The excess portion of the pouch where the gas pocket is present is then trimmed off to prepare the final battery cell.

Hereinafter, some embodiments will be described in more detail with reference to specific examples.

Example 1

A positive electrode active material: a conductive material: a PVDF binder were mixed in a weight ratio of 97:1:2 in N-methylpyrrolidone to prepare a positive electrode slurry. At this time, $Li_{-1.38}[Ni_{0.363}Co_{0.005}Mn_{0.642}]O_2$ was used as the positive electrode active material, and CNT was used as the conductive material. The positive electrode slurry was coated onto an aluminum current collector sheet, dried, and rolled to produce a positive electrode.

A negative electrode active material: a conductive material: a binder were mixed in a weight ratio of 96:1:3 in water to prepare a negative electrode slurry. At this time, graphite was used as the negative electrode active material, carbon black was used as a conductive material, and SBR and CMC as a binder were mixed and used in a weight ratio of 2:1. The negative electrode slurry was coated onto a copper current collector sheet, dried, and rolled to produce a negative electrode.

A separator was interposed between the positive electrode and the negative electrode produced as above to produce an electrode assembly, and the electrode assembly was inserted into the battery case, and then an electrolyte was injected, thereby producing a battery cell.

The battery cell was mounted on a jig and charged to 4.6V in 0.3 C constant current mode, and then changed to constant voltage mode to perform charging. Charging was terminated when the current reached 0.05 C. Then, the charged battery cell was discharged to 2.0V at a constant current of 0.5 C, and then the battery cell was detached from the jig. During the charging, charging was performed while pressurizing at a pressure of 0.5 kgf/cm² from SOC 0 to SOC 17, then the jig was adjusted, and charging and discharging were performed while pressurizing at a pressure of 5 kgf/cm².

Example 2

A battery cell was produced in the same manner as in Example 1 and mounted on a jig, and then charged to SOC 60 in 1.0 C constant current mode (first charging step). Then, the battery cell was charged to 4.6V in 0.4 C constant current mode, then changed to constant voltage mode to perform charging. Charging was terminated when the current reached 0.05 C (second charging step). Then, the charged battery cell was discharged to 2.0V at a constant current of 0.5 C, and then the battery cell was detached from the jig. During the charging, charging was performed while pressurizing at a pressure of 0.5 kgf/cm² from SOC 0 to 17, and then the jig was adjusted, and charging and discharging were performed while pressurizing at a pressure of 5 kgf/cm².

Example 3

A battery cell was produced in the same manner as in Example 1 and mounted on a jig, and then charged to 4.5V in 0.3 C constant current mode, then changed to constant voltage mode to perform charging. Charging was terminated when the current reached 0.05 C. Then, the charged battery cell was discharged to 2.0V at a constant current of 0.5 C, and then the battery cell was detached from the jig. During the charging, charging was performed while pressurizing at a pressure of 0.5 kgf/cm² from SOC 0 to SOC 17, and then the jig was adjusted, and charging and discharging were performed while pressurizing at a pressure of 5 kgf/cm².

Comparative Example 1

A battery cell was produced in the same manner as in Example 1 but was not mounted on a jig, and then charged to 4.6V in 0.3 C constant current mode, then changed to constant voltage mode to perform charging. Charging was terminated when the current reached 0.05 C. Then, the charged battery cell was discharged to 2.0V at a constant current of 0.5 C.

Comparative Example 2

A battery cell was produced in the same manner as in Example 1 and mounted on a jig, and then charged to SOC 60 in 1.0 C constant current mode. Then, the battery cell was charged to 4.6V in 0.4 C constant current mode. Then, the charged battery cell was discharged to 2.0V at a constant current of 0.5 C, and then the battery cell was detached from the jig. During the above charging, charging was performed while pressurizing at a pressure of 0.5 kgf/cm² from SOC 0 to SOC 17, and then the jig was adjusted, and charging and discharging were performed while pressurizing at a pressure of 5 kgf/cm².

Comparative Example 3

A battery cell was produced in the same manner as in Example 1 and mounted on a jig, and then charged to 4.35V in 0.3 C constant current mode, and changed to constant voltage mode to perform charging. Charging was terminated when the current reached 0.05 C. Then, the charged battery cell was discharged to 2.0V at a constant current of 0.5 C, and then the battery cell was detached from the jig. During the above charging, charging was performed while pressurizing at a pressure of 0.5 kgf/cm² from SOC 0 to SOC 17, and then the jig was adjusted, and charging and discharging were performed while pressurizing at a pressure of 5 kgf/cm².

Comparative Example 4

A battery cell was produced in the same manner as in Example 1 and mounted on a jig, and then charged to 3.9V in 0.3 C constant current mode, and changed to constant voltage mode to perform charging, and then, changed to constant current mode to perform charging. Then, the charged battery cell was discharged to 2.0V at a constant current of 0.5 C, and then the battery cell was detached from the jig. During the above charging, charging was performed while pressurizing at a pressure of 0.5 kgf/cm² from SOC 0 to SOC 17, and then the jig was adjusted, and charging and discharging were performed while pressurizing at a pressure of 5 kgf/cm².

Experimental Example 1

During the activating step of Examples 1 to 3 and Comparative Examples 1 to 4, capacity based on voltage was measured during the charging process to obtain a voltage-capacity graph, and the above voltage capacity graph was differentiated to obtain a dQ/dV graph.

Then, based on the charging curve area in the voltage range of 4.3 to 4.6V shown in the dQ/dV graph of Example 1, the percentage of charging curve area in the voltage range of 4.3V to 4.6V shown in the dQ/dV graphs of Example 2 and Comparative Examples 1 to 4 was measured. The measurement results are shown in [Table 1] below.

TABLE 1

|  | Charging curve area (%) in the voltage range of 4.3 V to 4.6 V appearing in dQ/dV graph |
| --- | --- |
| Example 1 | 100% |
| Example 2 | 100% |
| Example 3 | 80% |
| Comparative Example 1 | 100% |
| Comparative Example 2 | 100% |
| Comparative Example 3 | 5% |
| Comparative Example 4 | 0% |

Experimental Example 2: Initial Capacity

Lithium secondary batteries activated according to the methods of Examples 1 to 3 and Comparative Examples 1 to 4 were charged to 4.35 V at 25° C. and 0.33 C in constant current-constant voltage mode, and then cut off when the current reached 0.05 C. Then, the battery was discharged to 2.0V at a constant current of 0.33 C to measure the initial discharge capacity. When the initial discharge capacity of the lithium secondary battery of Example 1 was set to 100%, the relative ratio of the initial discharge capacities of the lithium secondary batteries of Example 2 and Comparative Examples 2 to 5 was measured. The measurement results are shown in [Table 2] below. Li plating occurred in the lithium secondary battery activated by the method of Comparative Example 1, and thus the battery operation was impossible.

TABLE 2

|  | Initial discharge capacity(%) |
| --- | --- |
| Example 1 | 100% |
| Example 2 | 98% |
| Example 3 | 98% |

TABLE 2-continued

| | Initial discharge capacity(%) |
|---|---|
| Comparative Example 1 | Impossible to measure the capacity due to Li precipitation |
| Comparative Example 2 | 96% |
| Comparative Example 3 | 73% |
| Comparative Example 4 | 71% |

As shown in Table 2, the lithium secondary batteries of Examples 1 to 3, which were activated by charging to a voltage of 4.3 V or more in constant current-constant voltage mode while applying pressure using a jig, exhibited superior initial capacity compared to Comparative Examples 1 to 4. On the other hand, it can be confirmed that the lithium secondary battery of Comparative Example 1, which was activated without pressurization, was unable to operate due to the occurrence of lithium-plating. Even if the pressurization process was included, when charging was performed only in constant current mode rather than constant current-constant voltage mode (e.g., Comparative Example 2), or when activation was performed at a charge cut-off voltage of 4.35 V or less (e.g., Comparative Examples 3 and 4), the initial discharge capacity decreased.

Experimental Example 3: High Temperature Life Characteristics

The process, in which the activated lithium secondary batteries activated according to the method of Examples 1 to 3 and Comparative Examples 1 to 4 were charged to 4.35V at 0.33 C at 45° C. in constant current-constant voltage mode (cut-off current 0.05 C), and then discharged to 2.0V at a constant current, was set to one cycle. After 50 cycles of charge and discharge, capacity retention and voltage sagging were measured. The measurement results are shown in FIGURE.

On the other hand, in the lithium secondary battery activated by the method of Comparative Example 1, Li plating occurred and thus battery operation was impossible.

As shown in FIGURE, the lithium secondary batteries activated by the methods of Examples 1 to 3 maintain a constant capacity and do not significantly increase the voltage sagging during the 50-cycle charge and discharge process. In contrast, the lithium secondary batteries activated by the methods of Comparative Examples 2 to 4 showed abnormal operation in which capacity increased as the cycle increased, and the voltage sagging increased significantly.

The invention claimed is:

1. A method for manufacturing a lithium secondary battery, the method comprising:
    preparing a battery cell including a positive electrode, a negative electrode and an electrolyte, wherein the positive electrode contains a lithium-rich manganese-based oxide in which a content of manganese in all metals excluding lithium is 50 mol % or greater, and a ratio of a number of moles of lithium to a number of moles of all metals excluding lithium (Li/Me) is greater than 1; and
    activating by charging and discharging the battery cell while applying pressure to the battery cell within a pressure range of 0.1 kgf/cm² to 10 kgf/cm², wherein during the activating, the charging includes charging in a constant current mode until a charge cut-off voltage, and then further charging in a constant voltage mode, and
    wherein the charge cut-off voltage is greater than 4.35 V,
    wherein in the activating, the applying pressure includes:
        applying a first pressurization pressure $P_1$ at a single constant charge rate from the beginning of the charging until SOC (state of charge) reaches to a point within a range from 10% to 20%, and
        then applying a second pressurization pressure $P_2$, wherein the first pressurization pressure $P_1$ and the second pressurization pressure $P_2$ satisfy the following Equation (1):

$$5P_1 \leq P_2 \leq 15P_1. \qquad \text{Equation (1)}.$$

2. The method of claim 1, wherein:
the charging in the constant-current mode is performed so as to include at least a part of a potential plateau section ranging from 4.4 V to 4.6 V.

3. The method of claim 1, wherein: the lithium-rich manganese-based oxide is represented by the following Chemical Formula 1:

$$Li_aNi_bCo_cMn_dM_eO_2 \qquad \text{[Chemical Formula 1]}$$

wherein, $1 < a$, $0 \leq b \leq 0.5$, $0 \leq c \leq 0.1$, $0.5 \leq d \leq 1.0$, and $0 \leq e \leq 0.2$, and M is at least one selected from the group consisting of Al, B, Co, W, Mg, V, Ti, Zn, Ga, In, Ru, Nb, Sn, Sr and Zr.

4. The method of claim 3, wherein:
in Chemical Formula 1, $1.1 \leq a \leq 1.5$, $0.1 \leq b \leq 0.4$, $0 \leq c \leq 0.05$, $0.5 \leq d \leq 0.80$, and $0 \leq e \leq 0.1$.

5. The method of claim 3, wherein:
the lithium-rich manganese-based oxide has a two phase crystalline structure represented by the following Chemical Formula 2:

$$X\,Li_2MnO_3 \cdot (1-X)Li[Ni_{1-y-z-w}Mn_yCo_zM_w]O_2 \quad \text{[Chemical Formula 2]}$$

wherein M is at least one metal ion selected from the group consisting of Al, B, Co, W, Mg, V, Ti, Zn, Ga, In, Ru, Nb, Sn, Sr, and Zr, and
wherein X is the ratio of the $Li_2MnO_3$ phase in the lithium-rich manganese-based oxide, and $0.2 \leq X \leq 0.5$, $0.25 \leq X \leq 0.5$, or $0.25 \leq X \leq 0.4$.

6. The method of claim 3, wherein:
the lithium-rich manganese-based oxide includes a coating layer on a surface of the lithium-rich manganese-based oxide,
    wherein the coating layer includes a coating element $M^1$ being at least one selected from the group consisting of Al, B, Co, W, Mg, V, Ti, Zn, Ga, In, Ru, Nb, Sn, Sr, and Zr,
wherein the coating layer is formed through at least one of a dry coating, wet coating, chemical vapor deposition (CVD), physical vapor deposition (PVD), or atomic layer deposition (ALD).

7. The method of claim 6, wherein:
a formation area of the coating layer is in a range of 10% to 100% based on a total surface area of the surface of the lithium-rich manganese-based oxide.

8. The method of claim 1, wherein:
during the constant-voltage mode, a cut-off current is from 0.01 C to 0.15 C.

9. The method of claim 1, wherein:

the charging in the constant-current mode comprises:

a first charging at a first constant current rate, and a second charging at a second constant current rate that is different from the first current rate.

10. The method of claim 9, wherein:

the first current rate and the second current rate are each independently from 0.1 C to 1.0 C.

11. The method of claim 9, wherein:

the first charging is performed until SOC (state of charge) reaches to a point within a range from 30% to 60%, and the second charging is performed until the SOC reaches to a point within a range from 90% to 100%.

12. The method of claim 1, wherein:

in the activating, the applying pressure to the battery cell is performed by mounting the battery cell on a jig and pressurizing the battery cell.

13. The method of claim 1, wherein:

in the activating, the applying pressure to the battery cell is performed while changing a pressurization pressure.

14. The method of claim 1, further comprising determining whether Equation (2) is satisfied:

$$0.5A \leq B \leq A \qquad \text{Equation (2):}$$

wherein a charging curve area (A) in a voltage range of 4.3 V to 4.6 V is obtained from a measurement device configured to generate a dQ/dV graph obtained by differentiating a graph of a voltage (V) and a battery charging capacity (Q) measured while charging the battery cell to 4.6 V, and wherein a charging curve area (B) in the range of 4.3 V to the charge cut-off voltage is obtained from a dQ/dV graph by differentiating a graph of a voltage (V) and a battery charge capacity (Q) measured while charging the battery cell to the charge cut-off voltage of the activating, determining a state of an activation of the lithium secondary battery based on Equation (2).

15. The method of claim 1, wherein: the first pressurization pressure P; is in a range from 0.1 kgf/cm$^2$ to 2 kgf/cm$^2$.

16. The method of claim 1, wherein:

the charge cut-off voltage is in a range from 4.35 V to 4.8 V.

17. The method of claim 1, wherein:

the discharging is performed in a voltage ranging from 4.6 V to 2.0 V.

18. The method of claim 1, wherein:

the activating is performed at a temperature ranging from 25° C. to 70° C.

19. The method of claim 1, wherein:

the activating further comprises aging the battery cell, so as to allow the electrolyte to be impregnated into an electrode assembly of the battery cell.

* * * * *